United States Patent [19]
Balme et al.

[11] 3,983,100
[45] Sept. 28, 1976

[54] PREPARATION OF SUSPENSIONS OF MALEAMIC ACIDS
[75] Inventors: Maurice Balme, Sainte-Foy-les-Lyon; Max Gruffaz, La Mulatiere, both of France
[73] Assignee: Rhone-Poulenc Industries, Paris, France
[22] Filed: Feb. 4, 1975
[21] Appl. No.: 546,925

[30] Foreign Application Priority Data
Feb. 7, 1974   France .............................. 74.04128

[52] U.S. Cl. ................................ 260/143; 260/192; 260/346.2 R; 260/448.2 N; 260/468 R; 260/475 N; 260/485 J; 260/514 J; 260/516; 260/518 R; 260/534 E; 260/207.1; 260/308 R
[51] Int. Cl.² ............... C07C 103/64; C07C 105/00
[58] Field of Search ........ 260/346.2, 518 R, 534 E, 260/514 J, 468 R, 143, 192, 448.2 N, 475 N, 485 J, 516

[56] References Cited
FOREIGN PATENTS OR APPLICATIONS
2,055,969   5/1971   France OTHER PUBLICATIONS
Flett et al., *Maleic Anhydride Derivatives*, N.Y. – John Wiley Publ. Co. (1952) pp. 104–105.

*Primary Examiner*—Natalie Trousof
*Assistant Examiner*—Bernard Dentz
*Attorney, Agent, or Firm*—Stevens, Davis, Miller & Mosher

[57] ABSTRACT

A suspension of a maleamic acid is provided by reacting maleic anhydride with an appropriate diprimary diamine in an organic diluent in the presence of a tertiary amine. The suspension has a low viscosity and the maleamic acid can readily be recovered from it.

11 Claims, No Drawings

PREPARATION OF SUSPENSIONS OF MALEAMIC ACIDS

The present invention relates to a process for the preparation of suspensions of maleamic acids.

It is known, for example from French Pat. No. 2,055,969, that maleamic acids are useful intermediates in the preparation of maleimides, and that they can be prepared, in particular, from maleic anhydride and primary amines.

When maleic anhydride is reacted in this way with a diprimary diamine in the presence of an organic diluent, a suspension is obtained. In practice, especially if the process is carried out continuously, it is desirable to produce suspensions of low viscosity so as to make them easy to convey and to facilitate the carrying out of subsequent reactions such as cyclodehydration for the purpose of producing bismaleimides.

The present invention provides a convenient process, which can be carried out continuously, for the preparation of fluid suspensions of bis-maleamic acids.

According to the present invention, there is provided a process which comprises reacting maleic anhydride with a diprimary diamine in the presence of an organic diluent and a tertiary amine.

The process of this invention is especially advantageous when it is carried out continuously, that is to say when maleic anhydride, the diprimary diamine and the tertiary amine are introduced into a reaction zone continuously or periodically, whilst the suspension containing the reaction product is withdrawn from this same reaction zone continuously or periodically respectively.

The diprimary diamines which can be employed in the process of the invention generally have the formula $NH_2 - R - NH_2$ in which R represents a divalent aliphatic, cycloaliphatic, aromatic or heterocyclic radical which possesses at least two carbon atoms.

More specifically, R can be, for example, a linear or branched alkylene radical with less than 13 carbon atoms, a cycloalkylene radical with 5 or 6 carbon atoms in the ring, a divalent heterocyclic radical containing at least one of the atoms O, N and S, a benzene-type or aromatic polycyclic radical, or a mixed radical comprising several radicals of the various types mentioned, these various radicals optionally carrying substituents which do not give rise to side-reactions under the working conditions.

The diamines which are of very particular value for the process of this invention are those in which R represents a divalent radical comprising several benzene-type or alicyclic radicals bonded directly or via a divalent atom or group such as, for example, oxygen or sulphur atoms, alkylene groups with 1 to 3 carbon atoms, or the following groups $-NR_2-$, $-P(O)R_1-$, $-N=N-$,

$-CONH-$, $-SO_2-$,

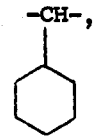

$-CO-O-$,

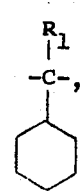

$-S-S-$, $-SiR_1R_2-$, $-NY-CO-X-CO-NY-$,

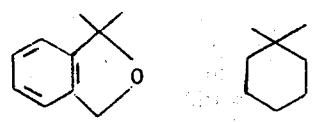

and $-O-CO-X-CO-O-$ in which $R_1$, $R_2$ and Y each independently represents an alkyl radical with 1 to 4 carbon atoms or a cycloalkyl radical with 5 or 6 carbon atoms in the ring, or a benzene-type or polycyclic aromatic radical, and X represents a linear or branched alkylene radical with less than 13 carbon atoms, a cycloalkylene radical with 5 or 6 carbon atoms in the ring or a mono- or poly-cyclic arylene radical.

Specific diamines which can be used include ethylene-diamine, hexamethylene-diamine, meta-phenylenediamine, para-phenylene-diamine, benzidine, 4,4′-diamino-diphenylmethane, 4,4′-diamino-diphenyl ether, 4,4′-diamino-diphenylsulphone, 4,4′-diamino-dicyclohexylmethane, 1,4-diaminomethyl-cyclohexane, meta-xylylenediamine, para-xylylene-diamine, 1,1-bis-(4-amino-phenyl)cyclohexane, 4,4′-diamino-diphenylpropane, 4,4′-diaminotriphenylethane, 4,4′-diamino-triphenylmethane and 3,5-diamino-1,2,4-triazole.

The bis-maleamic acids prepared according to the invention have the formula

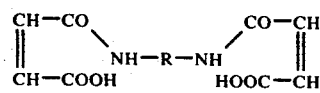

in which R is as defined above.

The anhydride and the primary diamine are advantageously introduced into the reaction zone in the form of two separate solutions, the solvents used for these two solutions being identical or different, but, in the latter case, being miscible with one another. These solvents play the role of a diluent for the reaction medium and make it possible to dissipate the heat produced by the exothermic reaction.

Amongst the solvents which are particularly suitable, there may be mentioned: hydrocarbons such as benzene, toluene and cyclohexane, chlorinated derivatives such as chlorobenzene or methylene chloride, cyclic or acyclic ethers such as tetrahydrofurane, dioxane or diethyl ether, and dialkyl ketones such as acetone or methyl ethyl ketone.

The concentrations of the solutions of maleic anhydride and of the diprimary diamine are chosen so that the concentration of solid material in the reaction mixture (and thus in the dispersion of maleamic acid) is preferably from 25 to 40% by weight.

The presence of a small amount of water in the reaction medium can improve the yields somewhat. This water is generally incorporated in an amount from 0.2 to 10%, preferably 1 to 5%, by weight relative to the solvent present in the reaction medium.

The molar ratio anhydride/diamine, characterising the relative rate of addition of these two reagents, is advantageously from 2.0 to 2.4.

Amongst the tertiary amines which can be used in the process there may be mentioned especially trialkylamines as well as N,N-dialkyl-anilines in which the alkyl radicals possess 1 to 12 carbon atoms. The use of triethylamine and N,N-dimethyl-aniline is advantageous. The tertiary amine is preferably present in an amount from 0.15 to 0.4 mol per mol of maleic anhydride. It is preferred to introduce the tertiary amine separately from the maleic anhydride thereby improving the yield of bis-maleamic acid.

The process according to the present invention is advantageously carried out in a reactor comprising, essentially, a container as well as means for introducing solutions of the reagents, means for withdrawing the suspension and means for stirring the reaction zone.

The process according to this invention makes it possible to obtain suspensions which can be conveyed conveniently. These suspensions undergo sedimentation rather quickly when they are at rest. This makes it possible to separate the bis-maleamic acid from the reaction medium more easily, by simple filtration, when it is desired to isolate it.

This ability to undergo sedimentation is in fact closely related to the viscosity and fluidity of the suspensions of bis-maleamic acids and to the ease with which they can be conveyed; in fact, the more rapid is the sedimentation on standing the closer is the viscosity of the suspension to that of the diluent (s) or solvent (s) employed.

The suspensions of bis-maleamic acid can also be used directly without prior sedimentation, for example for the purpose of preparing bis-maleimides, the ease with which they undergo sedimentation, and consequently the ease with which they can be conveyed, facilitating transfer from one reaction zone to another.

In addition to the advantages already listed, the process according to this invention has the advantage of giving good yields of bis-maleamic acids and of being able to function continuously without it being necessary to take precautions or use very elaborate controls.

The following Examples further illustrate the present invention.

The suspensions obtained in these Examples are characterised by their degree of sedimentation, measured after withdrawing a portion of suspension and leaving it at rest for 30 minutes. The degree of sedimentation is equal to 100 (1-VI/V), V being the volume of suspension removed and VI the volume occupied by the precipitate after 30 minutes at rest.

In practice, a suspension can be conveyed easily when this degree of sedimentation is greater than 15% and preferably greater than or equal to 20%.

EXAMPLE 1

200 g of acetone and 5.45 g of water are introduced into a reactor which has a useful capacity of 500 cm$^3$ and is equipped with a stirrer, a reflux condenser, a thermometer, a dropping funnel, two upper tubes and one lower tube.

The mixture is heated to the boiling point and, on the one hand, 223.6 g/hour of a solution obtained by mixing 734.7 g of 4,4'-diamino-diphenylmethane, 2,484 g of acetone, 103 g of water and 178.5 g of triethylamine, and, on the other hand, 139.7 g/hour of a solution obtained by mixing 909 g of maleic anhydride and 1,569 g of acetone are added separately, simultaneously and continuously via the two upper tubes.

Every half hour, 215 cm$^3$ of the suspension of bis-maleamic acid are removed. The average dwell time in the reactor is 30 minutes.

After operating for 3 hours 30 minutes, the degree of sedimentation of the suspension withdrawn is 35%.

EXAMPLE 2

162.15 g of acetone,
4.5 g of water and
6.3 g of triethylamine
are introduced into the equipment used in Example 1.

The two solutions of diamino-diphenylmethane (+ triethylamine), on the one hand, and of maleic anhydride, on the other hand, used in Example 1, are introduced separately, simultaneously and continuously into the above mixture, which has been heated to the boiling point; the solutions are introduced at a flow rate of 246.5 g/hour in the case of the first (instead of 223.6 g/hour in Example 1) and 141.3 g/hour in the case of the second (instead of 139.7 g/hour).

Samples are withdrawn under the conditions of Example 1 (average dwell time in the reactor: 30 minutes).

After operating for 3 hours 30 minutes, the degree of sedimentation of the suspension withdrawn is 25%.

EXAMPLE 3

The two solutions of diamino-diphenylmethane (+ triethylamine) on the one hand, and of the anhydride, on the other hand, are introduced into the suspension which remains in the reactor from Example 2 and which is kept at the boiling point, at a flow rate of 496.2 g/hour (instead of 246.5 g/hour) in the case of the first, and 284.08 g/hour (instead of 139.7 g/hour) in the case of the second solution.

Every half hour 430 cm$^3$ of suspension are removed. The average dwell time in the reactor is still 30 minutes.

After 2 hours the degree of sedimentation of the suspension withdrawn is 33%.

EXAMPLE 4

On the one hand, 137.5 g/hour of a solution of 909 g of maleic anhydride in 1,569 g of acetone, and, on the other hand, 230 g/hour of a solution of 881 g of 4,4'-diamino-diphenylmethane in 2,978 g of acetone also containing 123.7 g of water and 214 g of triethylamine are added separately, simultaneously and continuously to 250 cm³ of a suspension as described in Example 1 which is kept at the boiling point.

183 g of suspension are removed every half hour. The average dwell time in the reactor is 35 minutes. These operations are continued for 17 hours. The degree of sedimentation of the suspensions varies between 25 and 30% (variation attributed to some irregularity in the flow rate of the pumps which supply the reagents).

The yield of bis-maleamic acid (relative to the diamine) is approximately 99%.

EXAMPLE 5

On the one hand, 137.1 g/hour of a solution of 909 g of maleic anhydride in 1,569 g of acetone, and, on the other hand, 223.2 g/hour of a solution of 891 g of 4,4'-diamino-diphenylmethane in a mixture of 3,010 g of acetone and 216 g of triethylamine are added separately, simultaneously and continuously to 250 cm³ of a suspension as described in Example 1, which is kept at the boiling point.

180 g of suspension are withdrawn every half hour (average dwell time in the apparatus: 40 minutes).

The operation is continued for 10 hours.

The degree of sedimentation of the samples of suspension removed varies between 25 and 50%.

Yield of bis-maleamic acid relative to the diamine: 100%.

EXAMPLE 6

On the one hand, 137.6 g/hour of a solution of 909 g of maleic anhydride in 1,569 g of acetone, and, on the other hand, 237.6 g/hour of a solution of 445.5 g of 4,4'-diamino-diphenylmethane in 1,505 g of acetone also containing 108 g of triethylamine are added separately, simultaneously and continuously to 250 cm³ of a suspension as described in Example 1, which is kept at the boiling point.

188 g of suspension are withdrawn every half hour. The average dwell time in the equipment is 40 minutes.

The experiment lasts 5 hours.

The degree of sedimentation varies between 35 and 50%.

We claim:

1. In a process for the preparation of a suspension of a bis-maleamic acid which comprises reacting maleic anhydride with a diprimary diamine in the presence of an organic diluent the improvement wherein the reaction is carried out in the presence also of a tertiary amine.

2. Process according to claim 1 in which the maleic anhydride, diprimary diamine and tertiary amine are introduced continuously into a reaction zone and a suspension containing the reaction products is continuously withdrawn from said reaction zone.

3. Process according to claim 1 in which the diprimary diamine has the formula: $NH_2 — R — NH_2$ in which R represents a divalent aliphatic, cycloaliphatic, aromatic or heterocyclic radical which possesses at least two carbon atoms.

4. Process according to claim 3, in which R represents a divalent radical comprising more than one aromatic or alicyclic radical, bonded to one another directly or via an oxygen or sulphur atom, an alkylene group with 1 to 3 carbon atoms, or a group of the formula: $—NR_2—$, $—P(O)R_1—$, $—N=N—$,

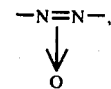

$—CONH—$, $—SO_2—$,

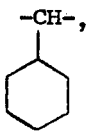

$—CO—O—$,

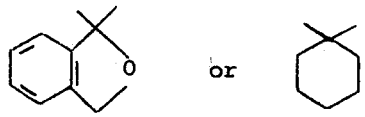

$—S—S—$, $—SiR_1R_2—$, $—NY—CO—X—CO—NY—$, $—O—CO—X—CO—O—$,

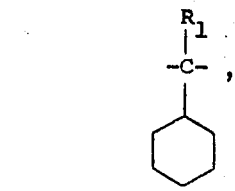

in which $R_1$, $R_2$ and Y each independently represents an alkyl radical with 1 to 4 carbon atoms or a cycloalkyl radical with 5 or 6 ring carbon atoms or a benzene or polycyclic aromatic radical, and X represents a linear or branched alkylene radical with less than 13 carbon atoms, a cycloalkylene radical with 5 or 6 ring carbon atoms or a mono- or poly-cyclic arylene radical.

5. Process according to claim 1, in which the anhydride and the diprimary diamine are introduced separately in the form of solutions in a common solvent or in solvents which are miscible with one another.

6. Process according to claim 1, in which the molar ratio anhydride/diamine is from 2 to 2.4.

7. Process according to claim 1, in which the tertiary amine is a trialkylamine or an N,N-dialkylaniline, in which the alkyl radicals contain 1 to 12 carbon atoms.

8. Process according to claim 7, in which the tertiary amine is triethylamine or N,N-dimethylaniline.

9. Process according to claim 1, in which the tertiary amine is present in an amount from 0.15 to 0.4 mol per mol of maleic anhydride.

10. Process according to claim 1, in which the reaction medium contains 0.2 to 10% by weight of water relative to the solvent.

11. Process according to claim 1 in which the anhydride and diprimary diamine are introduced separately and the tertiary amine is present in an amount from 0.15 to 0.4 mol per mol of maleic anhydride and is a trialkylamine or an N,N-dialkylaniline.

* * * * *